Figure 1:
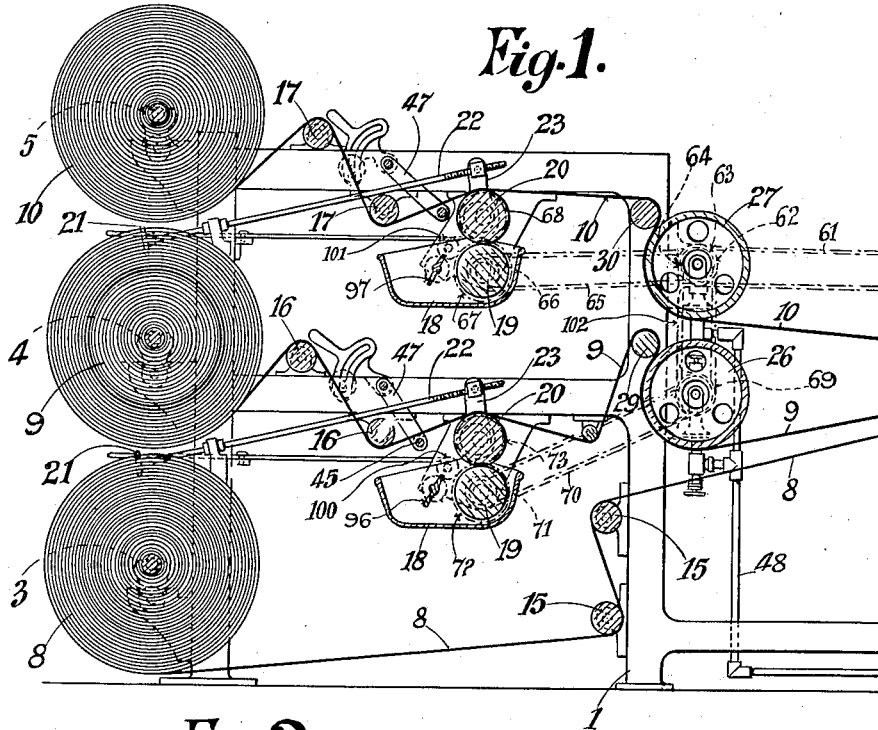

Aug. 11, 1936.   T. ROWBOTHAM ET AL   2,050,382
COMBINING OF THREE OR MORE LAYERS OF MATERIAL TOGETHER
BY MEANS OF A LIQUID ADHESIVE SUBSTANCE
Filed Jan. 10, 1935   2 Sheets-Sheet 1

Inventors.
Thomas Rowbotham,
William Shaw.
per Ferdinand Broster Bosshardt
Attorney.

Aug. 11, 1936.   T. ROWBOTHAM ET AL   2,050,382
COMBINING OF THREE OR MORE LAYERS OF MATERIAL TOGETHER
BY MEANS OF A LIQUID ADHESIVE SUBSTANCE
Filed Jan. 10, 1935   2 Sheets-Sheet 2

Inventors
Thomas Rowbotham,
William Shaw:
per Ferdinand Broster Bosshardt
Attorney.

Patented Aug. 11, 1936

2,050,382

UNITED STATES PATENT OFFICE 2,050,382

COMBINING OF THREE OR MORE LAYERS OF MATERIAL TOGETHER BY MEANS OF A LIQUID ADHESIVE SUBSTANCE

Thomas Rowbotham, Bramhall, and William Shaw, Stockport, England

Application January 10, 1935, Serial No. 1,218
In Great Britain July 20, 1934

4 Claims. (Cl. 154—37)

This invention relates to the combining of three or more layers of web material together by means of an aqueous adhesive of non-waterproof nature and consisting of water and glue or an aqueous paste which is liquid at normal temperature.

Previous to our invention three or more layers of materials have usually been combined together by means of aqueous flour paste to produce jacquard cards, art papers, paper board and so forth, the paste being applied in a thick state and the layers being then pressed hydraulically. This method of production produced a dulled surface on the lining layers and also caused discoloration of the lining layers.

Prior to our invention it has also been proposed to combine two or more plies of paper together by means of liquid paste or glue by running the plies between heated pressure rollers, the paste or glue being supplied by providing it in a trough formed by opposing surfaces of the heated rollers and the plies running through this trough until they reach the nip of the rollers. In this arrangement the paste or glue is heated by the rollers and therefore penetrates the material of the plies deeply, the plies are coated to a maximum thickness and the thickness of the coat cannot be controlled, and the plies are united by the nip of the rollers whilst the paste or glue is in a completely wet state and therefore any water forming a constituent of the liquid paste or glue is completely trapped between and saturates the plies, thereby necessitating subsequent hydraulic pressure and heating if the combined layers are required to be dry. Due to trapping of the said water this arrangement therefore produces a dulled surface on the combined layers and also caused discoloration and a shrinkage in thickness when dry.

Prior to our invention it has also been proposed, in the combining of layers of material by means of gum or other non-aqueous adhesives which require heat for their liquefaction and are solid when cold, to heat the non-aqueous adhesive to liquefy it for application to the layers and to keep it in a liquid condition by means of heated rollers until the layers have been pressed together to unite them, the adhesive then requiring to cool in order to enable it to set or solidify. This arrangement is not usable for aqueous adhesives of a non-waterproof nature because if it were so used, it would have all of the defects stated in the preceding paragraph.

It has also been proposed prior to our invention to unite three webs of material together by means of an aqueous paste applied by furnishing rollers only to one side of each of the outermost webs, the three webs then passing between uniting pressure rollers and heating rollers, but in this arrangement there is no provision for preventing the whole of the water constituent of the paste from becoming trapped between the webs and producing the hereinbefore stated deleterious effects on the product.

In a proposal for producing lined straw board made prior to our invention the straw board after manufacture and partial drying has a coating of colouring matter applied to it, whereupon it is passed over a heated drying cylinder and round further heated drying cylinders, the lining paper being united with the coated side by pressure rollers whilst the straw board is passing over the first of the further drying cylinders. In this arrangement, for the purpose of uniting with the straw board, the lining paper, immediately before it arrives between the pressure rollers and the heated drying cylinder cooperating therewith, is coated on one side with a coat of paste by means of cold furnishing rollers running in a cold trough. The whole of the water constituent of the paste is therefore trapped between the lining and the paste board with the hereinbefore stated deleterious consequences to the product.

The object of our invention is to overcome these defects and also to produce a harder product of given thickness with the use of a less number of layers of the same thickness.

To attain the hereinbefore stated object we apply at normal atmospheric temperature a single thin coat of the said aqueous adhesive to one side of the two or more layers of web material, and before the said layers are brought into contact with one another we evaporate away a large proportion of the water constituent of the adhesive by heat, whereby the adhesive coat is robbed of the major portion of its water constituent before the said portion can be trapped between and absorbed by the said layers.

Figure 1A:
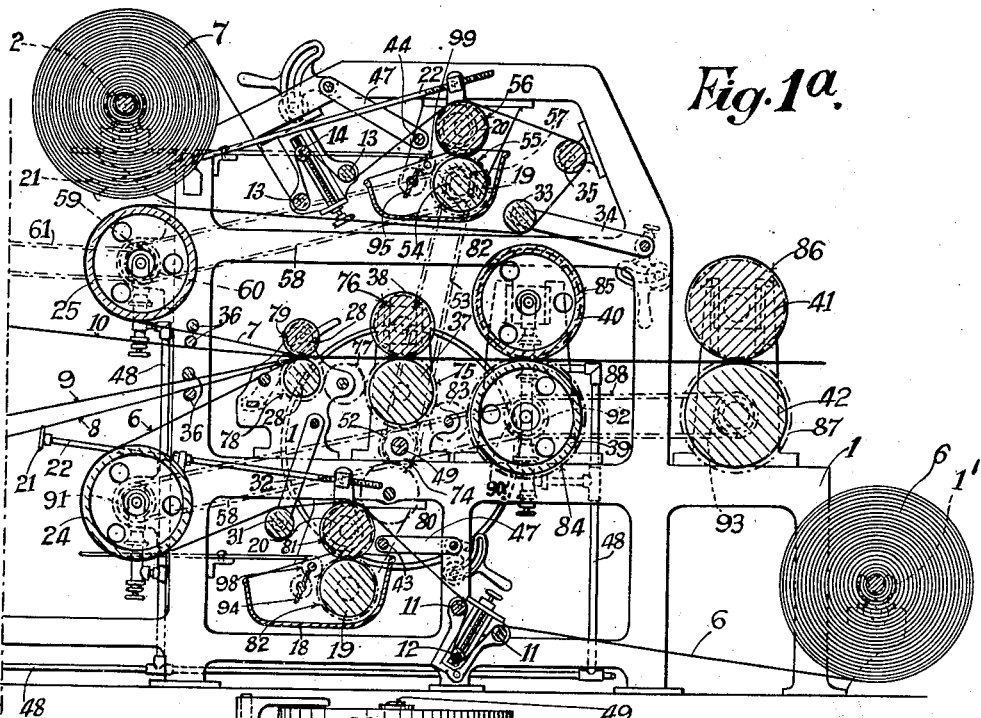

The accompanying drawings show a convenient mechanism for use in carrying out our novel process. In the drawings Figure 1 is a side view in section of a part of a layer combining machine, and Figure 1a is a side view in section of the remaining part thereof.

Figure 2:
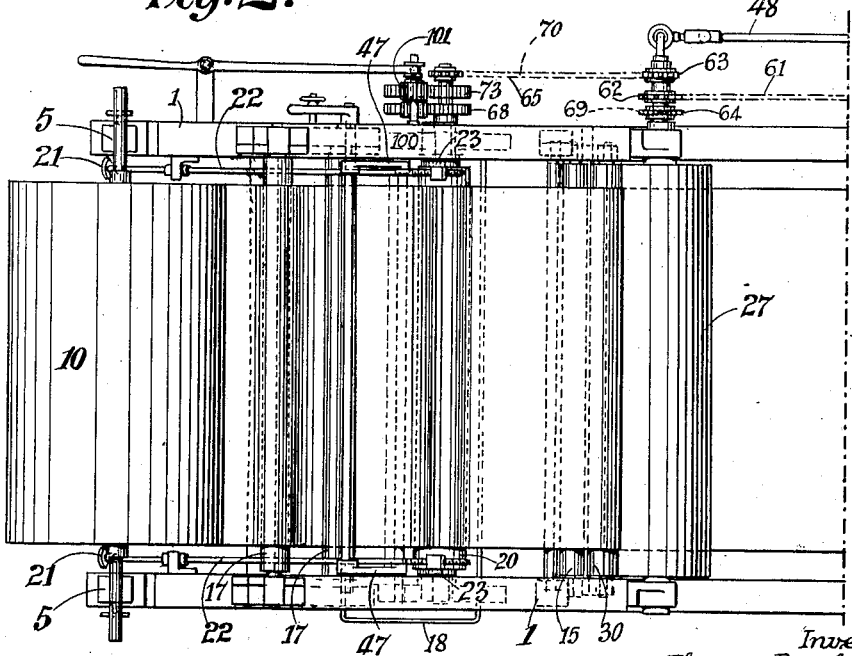
Figure 2A:
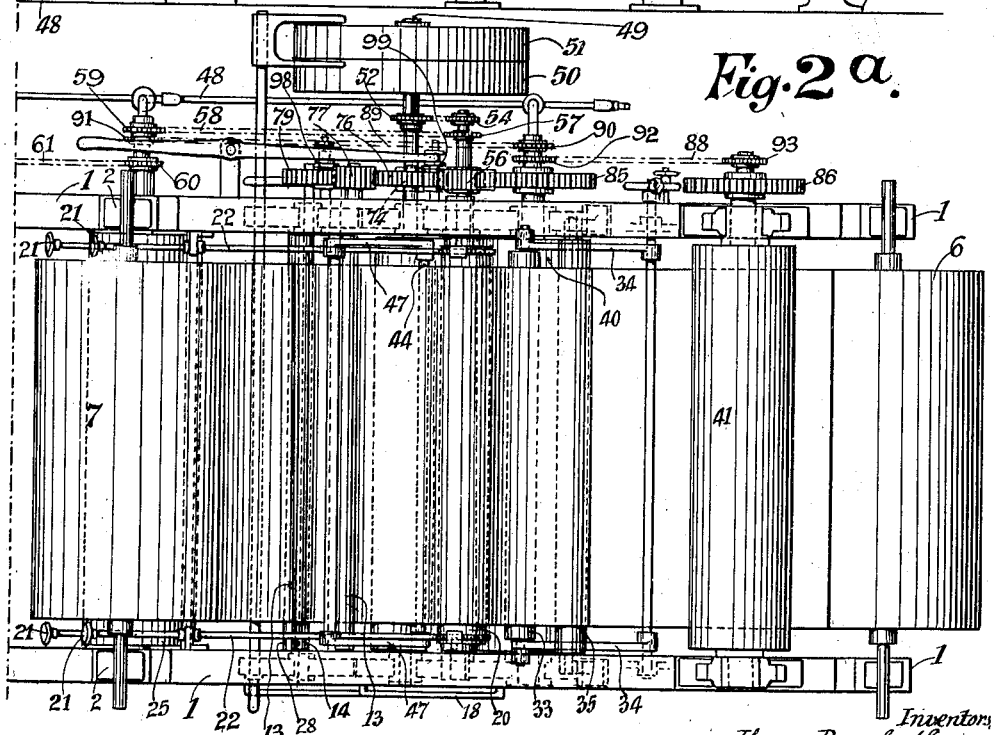

Figure 2 is a plan view of the first named part of the said machine, and Figure 2a is a plan view of the second named part thereof.

Referring to the drawings, in the construction shown therein the machine frame 1 is provided roller 40. The calender rollers 41 and 42 have meshing gear wheels 86 and 87 respectively, the roller 42 being driven from the roller 39 by a chain 88 and sprocket wheels 92 and 93. The heated roller 24 is also driven from the heated roller 39 by means of a chain 89 and sprocket wheels 90 and 91.

Rotary paddles 94, 95, 96, and 97 respectively may be provided in the troughs 18 to agitate the adhesive when required. The paddle 94 may be driven from the gear wheel 82 by means of an axially disengageable carrier wheel 98. The paddle 95 may be driven from the gear wheel 55 by an axially disengageable carrier wheel 99. The paddle 96 may be driven from the gear wheel 72 by an axially disengageable carrier wheel 100. The paddle 97 may be driven from the gear wheel 67 by an axially disengageable carrier wheel 101.

All the gearing is so chosen that the surface speeds of the parts in contact with the materials are uniform.

In operation the materials 6 and 7, for example consisting of lining papers and the materials 8, 9 and 10 for example each consisting of thicker, single or multiply material such as paper or board are all drawn from the reels thereof by the feed rollers 28, assisted by the coating rollers 20, the heated rollers 24, 25, 26, and 27, the uniting rollers 37, 38, the heating rollers 39, 40, and the calender rollers 41, 42. One side of each of the materials 6, 7, 9, and 10 receives a thin coat of aqueous glue or paste and the coats are spread and equalized by the rollers 31, 33, 29, and 30 respectively. The materials 6, 7, 9, and 10 are then heated by the hot rollers 24, 25, 26, and 27 and the heat applied thereto is sufficient to drive off the greater portion of the water from the adhesive so that it is in a nearly dry but still sticky condition when the materials arrive at the nip of the feed rollers 28. At the feed rollers 28 the coated side of the material 7 comes into contact with the uncoated side of the material 10, the coated side of which comes into contact with the uncoated side of the material 9. The coated side of the material 9 comes at the said feed rollers into contact with one of the uncoated sides of the material 8, whilst the coated side of the material 6 comes into contact with the other uncoated side of the material 8. Thus a single thin coat of adhesive which has already been robbed of most of its water is present to unite adjacent surfaces together, whilst the outer surfaces of the lining or outer layers are uncoated.

The uniting rollers press the materials together whilst the coats of adhesive are still sticky and thereby cause the coats to uniformly and securely stick the layers of material together. The action of the hot rollers 39, 40 on the united layers drives off the final traces of water from the adhesive and the calender rollers impart a final pressure to the united layers which may then be reeled or cut into suitable lengths according to their stiffness or the purpose for which the united material is required.

Due to the introduction between the layer of the minimum quantity of liquid adhesive necessary to unite them and the very important step of preheating of the thinly coated materials immediately after coating but before they are allowed to come together, and consequent driving off of most of the water from the adhesive before the said water has time to be absorbed by the layers of material or be trapped between the said layers, there is so little water left when the layers come together that the paste is already nearly dry and therefore is incapable of staining or otherwise changing the appearance of the material. The pressing of the materials only when they have become already nearly dry avoids any thinning thereof and consequently the united material is greater in thickness than would be the case if the pressure were of long duration and applied to the layers whilst saturated with aqueous adhesive.

If required, the roller 37 may alternatively be of metal without a rubber covering.

The hereinbefore described machine can also be used to obtain a product composed of only three united layers, by omission of the reels of material 9 and 10 and thereby produce a central layer provided on each side with a lining or other layer.

We claim—

1. A process of combining of three or more layers of web material together by means of an aqueous adhesive of non-waterproof nature and composed of water and gelatine glue which sets at atmospheric temperature, consisting in applying at normal atmospheric temperature a single thin coat of the said aqueous adhesive to one side of each of all of the said layers except one which is left entirely uncoated, and in evaporating away a large proportion of the water constituent of each of the said coats of adhesive by heat before the coated sides of the said layers are brought into contact with the non-coated sides of the layers, and in uniting the said layers together by means of the said coated sides only after the said larger proportion of the water has been evaporated away, each coat of adhesive being thereby robbed of the major portion of its water constituent before the said portion can be absorbed by the layers before they are united and be trapped between the layers when they are united by the adhesive coats.

2. A process of combining of three or more layers of web materials together by means of an aqueous adhesive of non-waterproof nature and composed of water and gelatine glue which sets at atmospheric temperature, consisting in running each layer except one over a coating roller furnished with the said aqueous adhesive in an unheated state for imparting a uniformly thin coat of the said adhesive to one side thereof, then immediately thereafter passing each coated layer along a separate path round a separate heated roller for evaporating from each coat of adhesive the major portion of the water contained therein, then guiding the layers separately along separate but convergent paths for enabling the evaporation of the said portion of the water to complete itself before the coated sides of layers contact with the non-coated sides thereof and thereafter pressing the said layers together and uniting them by the nearly completely predried aqueous adhesive.

3. A process of combining of more than two layers of continuously travelling web material together by means of an aqueous adhesive of non-waterproof nature and composed of water and gelatine glue which sets at atmospheric temperature to produce a stiff product, consisting in commencing the process with all the layers in a dry state, applying a thin coat of the adhesive in a cold liquid state to one side of all the layers except an inner layer, leaving the said inner layer entirely uncoated and in a dry state, keeping the said layers apart, evaporating off the major portion of the water from the said coats of adhesive whilst the layers are kept separate, and thereupon immediately bringing the coated and dry uncoated layers into intimate contact with each other and sticking them all together by the said adhesive before the residue of water has evaporated from the said coats of adhesive.

4. A machine for use in carrying out the process according to claim 1, comprising the combination and sequence of means for simultaneously coating the layers separately with coats of cold liquid adhesive, equalizing means for equalizing the said coats separately immediately after the application of the said coats to the layers, evaporating means for simultaneously evaporating water from the said coats separately immediately after the equalizing of the said coats, guide rods for preventing contact of the layers with one another after the evaporating means have acted on the said coats, guide rollers for bringing the layers together only after the major proportion of water has been evaporated from the said coats, and cold pressure rollers for uniting all of the layers together by the adhesive after they have been guided together by the guide rollers, all of the said means being combined for simultaneous action on the webs whilst they are travelling.

THOMAS ROWBOTHAM.
WILLIAM SHAW.